No. 666,210. Patented Jan. 15, 1901.
M. SHERIDAN.
DISINFECTING APPARATUS.
(Application filed Mar. 27, 1900.)
(No Model.)
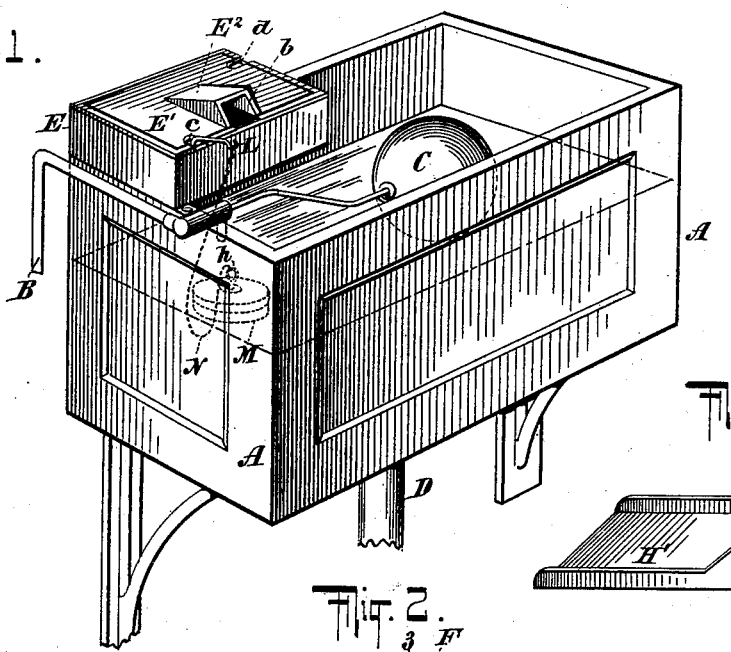
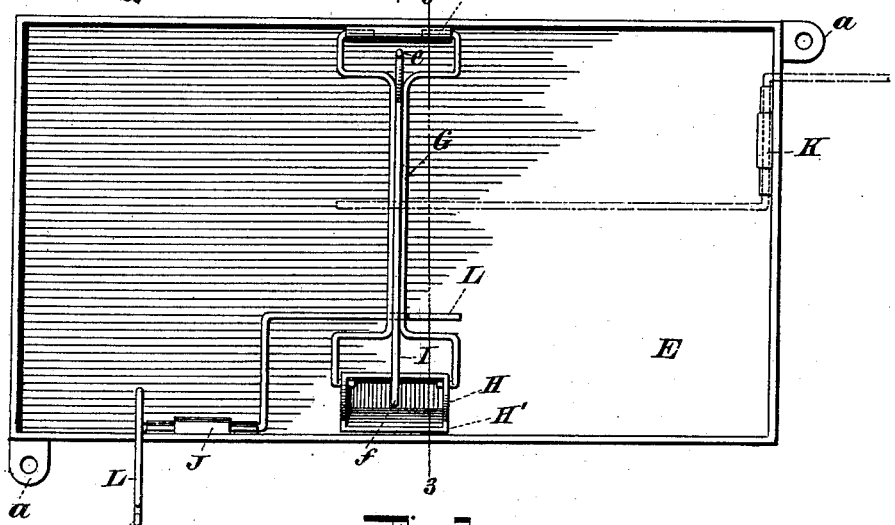
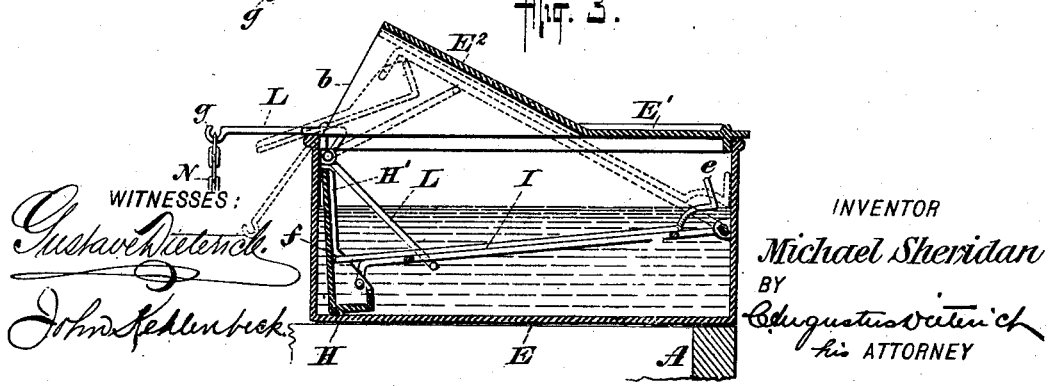
WITNESSES:
Gustave Dieterich
John Kehlenbeck
INVENTOR
Michael Sheridan
BY
C. Augustus Dieterich
his ATTORNEY

UNITED STATES PATENT OFFICE.

MICHAEL SHERIDAN, OF NEW YORK, N. Y., ASSIGNOR TO WALLACE ROSENHEIM, OF SAME PLACE.

DISINFECTING APPARATUS.

SPECIFICATION forming part of Letters Patent No. 666,210, dated January 15, 1901.

Application filed March 27, 1900. Serial No. 10,372. (No model.)

*To all whom it may concern:*

Be it known that I, MICHAEL SHERIDAN, a citizen of the United States, residing at the city of New York, borough of Manhattan, in the county and State of New York, have invented certain new and useful Improvements in Disinfecting Apparatus, of which the following is a full, clear, and exact specification.

My invention relates to improvements in apparatus for dispensing disinfecting and deodorizing fluids; and the same has for its object, more particularly, to provide a simple, efficient, and reliable apparatus adapted to be used in connection with a flushing-cistern, whereby a given quantity of disinfecting fluid will be automatically discharged into said flushing-cistern whenever the water is withdrawn therefrom.

The object above set forth I am enabled to attain by means of my invention, which consists in the novel details of construction and in the combination, connection, and arrangement of parts, as hereinafter more fully described and then pointed out in the claims.

In the accompanying drawings, forming part of this specification, wherein like letters of reference indicate like parts, Figure 1 is a perspective view of a cistern with an apparatus constructed according to and embodying my invention applied thereto. Fig. 2 is an enlarged top or plan view of the apparatus having the cover removed to expose the interior mechanism. Fig. 3 is a section of the apparatus with the cover in position thereon, said section being taken on the line 3 3 of Fig. 2; and Fig. 4 is a perspective view of the fluid-dipper.

In said drawings, A designates a cistern of ordinary construction having a water-supply pipe B, provided with a float-valve C, adapted to automatically control the supply of water to said cistern A, and D denotes the discharge-pipe, leading from the bottom of the cistern. Supported upon said cistern A at one of its corners is arranged the disinfecting apparatus, comprising a rectangular receptacle E, made of metal or other suitable material and provided at its base with ears $a$, provided with apertures adapted to receive screws, whereby to secure said receptacle E upon said cistern A. $E'$ denotes a cover for said receptacle, having a raised central portion $E^2$, provided with an inclined rectangular opening $b$ at its front. Said cover $E'$ is further provided at its front edge, adjacent to said opening $b$, with a recess $c$ and at one of its ends with a similar recess $d$. Within said receptacle E at about the center of its rear wall is arranged a bearing F, and G denotes an arm having its ends bifurcated and its rear end supported in the bearings F. Within the forward end of said arm G is pivotally supported an overbalanced dipper H, having a flat spout $H'$, and I denotes a rod or wire secured upon the upper surface of the arm G, said rod I having its rear end $e$ bent upward to form a stop adapted to contact with the rear wall of the receptacle E to limit the upward movement of said arm G and the forward end $f$ of said rod I straight and adapted to contact with the spout $H'$ of the dipper H to hold the same vertical when immersed in the fluid. The quantity of fluid discharged into the cistern A by the dipper H may be varied by securing a deeper or more shallow dipper within the forward end of the arm G.

Upon the inner side of the front wall of the receptacle E, adjacent to one of the ends, is arranged a bearing J, and upon the inner side of one of the end walls is arranged a similar bearing K.

L denotes a lever supported in the bearing J, having its inner end bent and disposed below the arm G and its outer end extending through the recess $c$ in the cover $E'$ and provided at its end with an eye or hook $g$.

Within the cistern A is a flat circular float M, having an eye $h$ secured upon its upper surface, and N denotes a chain having one end secured to the eye $h$ on the float M and its other end secured to the eye or hook $g$ of the lever L.

The operation of the apparatus is as follows: The receptacle E is first supplied with a sufficient quantity of fluid, which may be introduced therein through the opening $b$ in the raised portion $E^2$ of the cover $E'$. As soon as the valve controlling the egress of water from the cistern A through the pipe D is operated and the water permitted to discharge from said cistern the float M will descend as the level of the water falls and in so doing draw down the outer projecting end of the lever L, and thereby cause its inner end, which contacts with the under side of the arm G, to elevate the forward end of the latter and the dipper H, carried thereby. As the forward end of said arm G rises the spout H', which is overbalanced, will contact with the inside of the receptacle E until the dipper H reaches the top edge of the receptacle, whereupon the spout H' will, as the arm G continues to rise, be projected through the opening $b$ in the raised portion $E^2$ of the cover E' and tilted to discharge the contents of said dipper H into the cistern, as indicated in dotted lines at Fig. 3. As soon as the valve seals the discharge-opening in the cistern A and the water again rises therein the float M will be raised, and thereby remove the weight on the outer end of the lever L and permit its inner end and the arm G and dipper H, carried thereby, to fall back into the receptacle E and the dipper H again immersed in the fluid, which dipper will be elevated and its contents discharged into the cistern A with the next emptying thereof.

It will of course be understood that where the location of the tank is such that it is inconvenient to operate the arm G by means of the lever L at the front of the receptacle the same may be secured in the end bearing K, as illustrated in dotted lines at Fig. 2, and that the chain N instead of being secured to an independent float M may be secured directly to the stem of the float-valve C.

Without limiting myself to the details of construction, which may be varied within the scope of the invention, what I claim, and desire to secure by Letters Patent, is—

1. The combination with a cistern, of an apparatus for the purposes specified comprising a receptacle adapted to receive fluid, an arm pivotally supported at one end therein, a tilting receptacle pivotally secured to the free end of said arm, and means for elevating the free end of said arm, and tilting receptacle to discharge the contents thereof into the cistern, substantially as specified.

2. The combination with a cistern, of an apparatus for the purposes specified comprising a receptacle adapted to receive fluid, a cover therefor having an opening therein, an arm pivotally supported at one end within said receptacle, a tilting dipper pivotally secured to the free end of said arm, and means for elevating the free end of said arm and dipper to discharge the contents thereof through the opening in the cover and into the cistern, substantially as specified.

3. The combination with a cistern, of an apparatus for the purposes specified comprising a receptacle adapted to receive fluid, a cover therefor having an opening therein, an arm pivotally supported at one end within said receptacle, a tilting dipper pivotally secured to the free end of said arm, means arranged upon said arm to limit the upward movement thereof, and the inward movement of the end of the tilting dipper, and means for elevating the free end of said arm and dipper to discharge the contents of the dipper through the opening in the cover and into the cistern, substantially as specified.

4. The combination with a cistern, of an apparatus for the purposes specified comprising a receptacle adapted to receive fluid, a cover for said receptacle having a raised central portion provided with an opening, an arm having one end pivotally supported in said receptacle and its other end free, a tilting dipper having a flat projecting spout and pivotally secured to the free end of said arm, a lever pivotally secured within the receptacle first named having its inner end disposed below the pivoted arm and its other end extending outward through the cover of said receptacle, a float disposed within the cistern, and a connecting-section uniting said float and the end of the pivoted lever, substantially as specified.

5. The combination with a cistern, of an apparatus for the purposes specified comprising a receptacle adapted to receive fluid, a cover for said receptacle having an opening therein, an arm having one end pivotally supported in said receptacle and its other end free, a tilting dipper having a flat projecting spout secured to the free end of said arm, a stop at the inner end of said arm adapted to limit the upward movement thereof, and a stop at the free end of said arm adapted to maintain said dipper vertical when immersed, and a lever pivotally supported within the receptacle having its inner end disposed below the pivoted arm, and its other end extending outward through the cover of the receptacle, substantially as specified.

Signed at the city of New York, in the county and State of New York, this 24th day of March, 1900.

MICHAEL SHERIDAN.

Witnesses:
 EMANUEL JACOBUS,
 WALLACE ROSENHEIM.